Dec. 28, 1965    J. F. WOOD    3,225,449
DRAFTING INSTRUMENT
Filed March 16, 1965    4 Sheets-Sheet 1
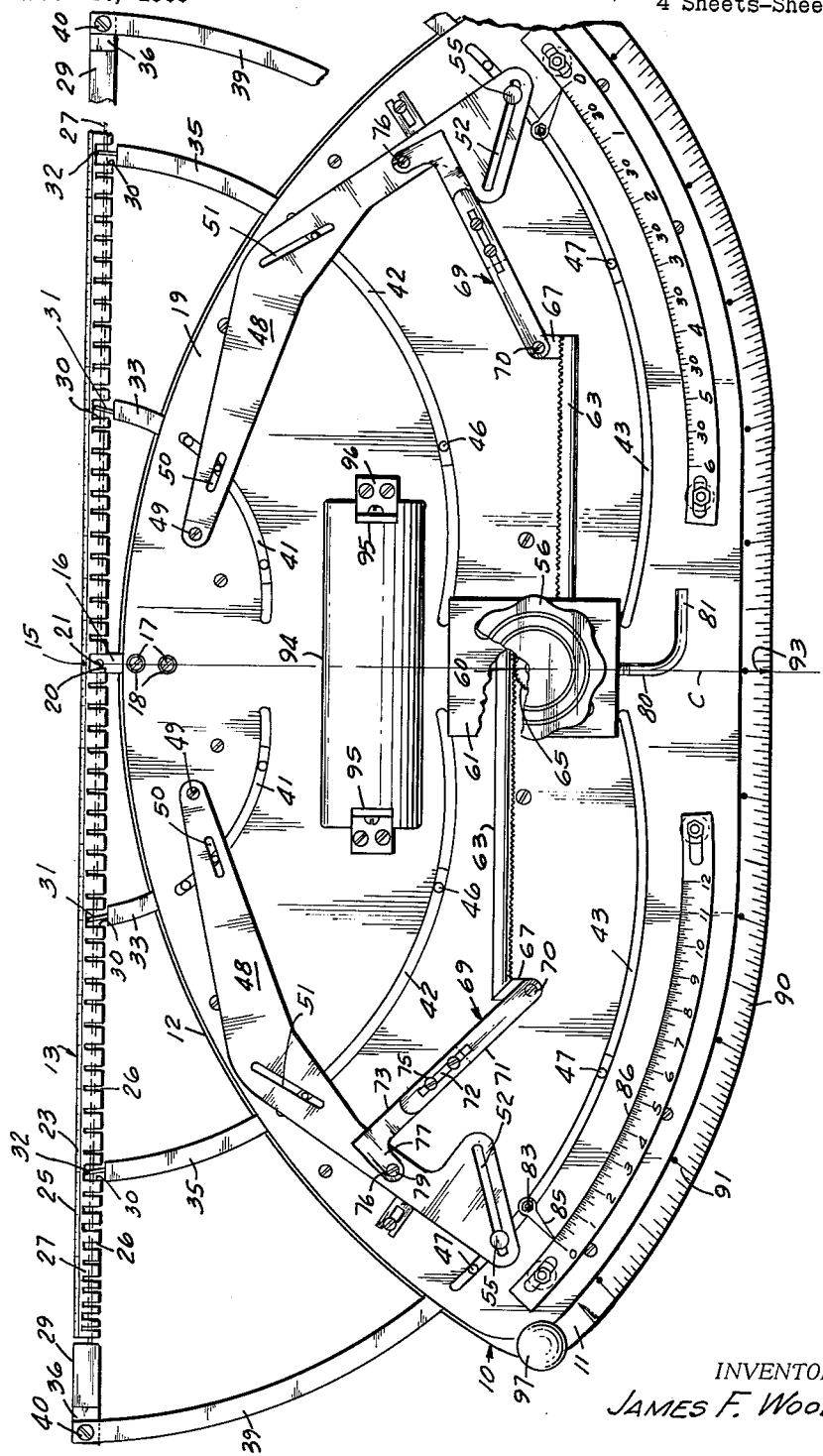
INVENTOR.
JAMES F. WOOD
ATTORNEYS Dec. 28, 1965 J. F. WOOD 3,225,449
DRAFTING INSTRUMENT
Filed March 16, 1965 4 Sheets-Sheet 2
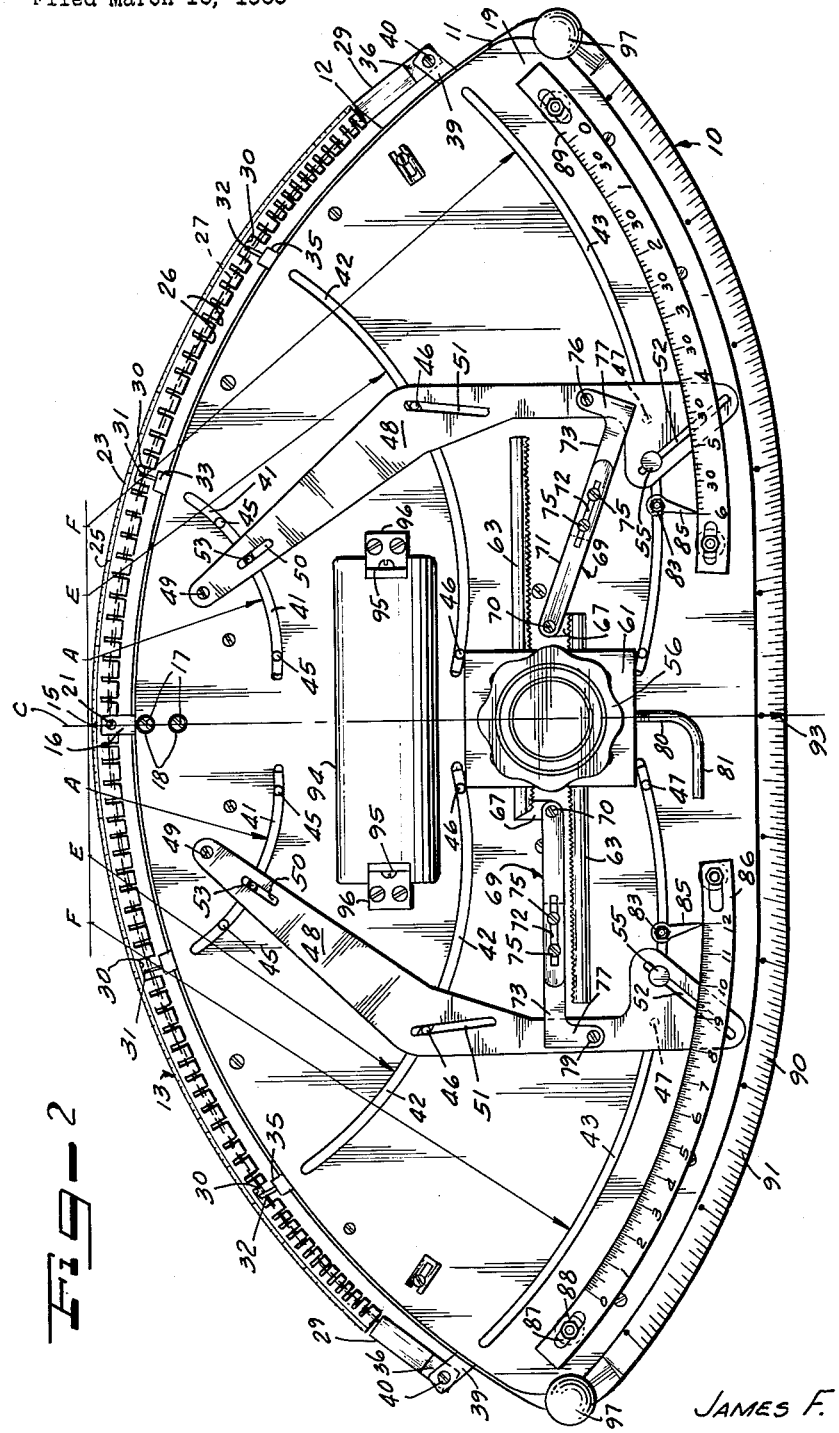
INVENTOR.
JAMES F. WOOD
BY ATTORNEYS

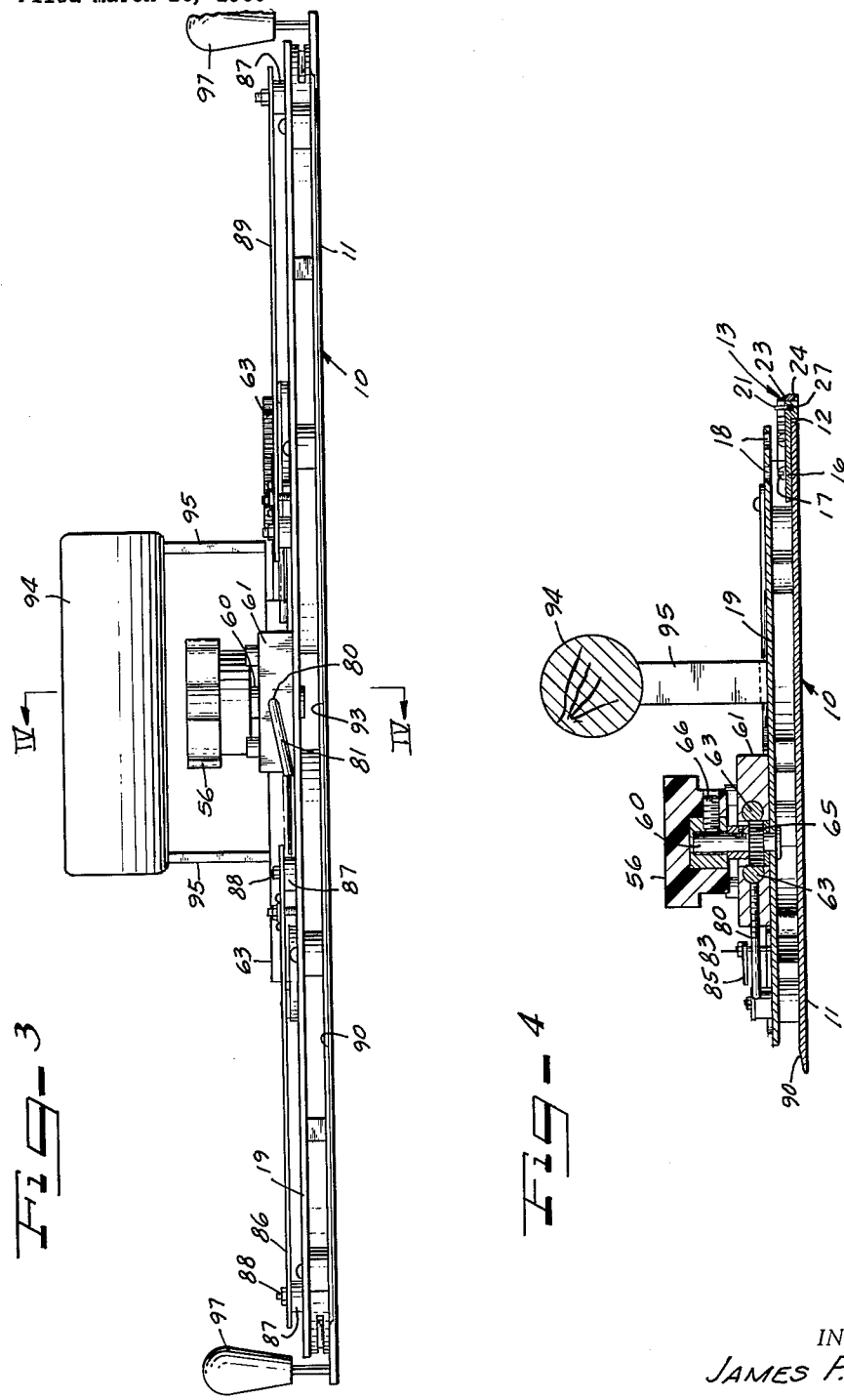

Dec. 28, 1965  J. F. WOOD  3,225,449
DRAFTING INSTRUMENT
Filed March 16, 1965  4 Sheets-Sheet 4

INVENTOR.
JAMES F. WOOD
BY *Hill, Sherman, Meroni, Gross & Simpson* ATTORNEYS

United States Patent Office 3,225,449
Patented Dec. 28, 1965

1

3,225,449
DRAFTING INSTRUMENT
James F. Wood, P.O. Box 2145, El Paso, Tex.
Filed Mar. 16, 1965, Ser. No. 440,229
18 Claims. (Cl. 33—177)

This application is a continuation-in-part of an application Serial No. 96,156, now abandoned, filed March 16, 1961.

This invention relates to improvements in drafting instruments and more particularly relates to a drafting instrument adapted for laying out designs of highways, although not limited to such use.

A principal object of the present invention is to provide a new and improved form of drafting instrument taking the place of the old railroad curve templets currently used in the design of highways, in which the curve may be uniformly varied from a straight line to a curve of a relatively short radius.

A further object of the invention is to provide a unitary drafting device for laying out curves and straight lines on highways and giving the curve values and functions upon adjusting the flexible scale or rule of the apparatus to conform to a predetermined curve.

Still another object of the invention is to provide a simple and improved form of drafting device which may be used as an aid to teaching, surveying and drafting and is readily adjustable, to a number of selected curve projections and designates the radius of curvature and angles of curvature of the projections.

A still further object of the invention is to provide an improved form of instrument to be used on a drafting table for the design of highways, railroad lines and the like, which visually designates the length of a curve, the degree of curvature of the curve and the radius of curvature, as the flexible rule of the device is flexed from a straight line position to various curved positions.

Still another object of the invention is to provide a drafting instrument for use on a drawing board which may be used as a straight edge, a T square, a curve templet, adjustable into various selected curves with drawing board accuracy, in which the angle of curvature and radius of curvature is visually ascertainable as the flexible rule is moved into its various adjusted positions, and in which the length of the curve may readily be scaled by the rule.

A still further object of the invention is to provide a simple and improved form of drafting instrument for use on a drafting table having a flexible scale or rule accurately positioned into a straight line position and into a plurality of curved positions by operation of a single knob, and visually designating the positions into which the rule is flexed.

These and other objects of the invention will appear from time to time as the following specification proceeds and with reference to the accompanying drawings wherein:

FIGURE 1 is a top plan view of a drafting instrument constructed in accordance with the principles of the present invention, showing the flexible rule positioned in a straight line position, with certain parts broken away;

FIGURE 2 is a top plan view of a drafting instrument shown in FIGURE 1 showing the flexible rule in an extreme flexed position to be used as a templet for drawing a relatively short radius curve;

FIGURE 3 is a side view of the drafting instrument shown in FIGURES 1 and 2 looking at the opposite side of the instrument from the flexible rule;

FIGURE 4 is a fragmentary transverse sectional view of the instrument taken substantially along line IV—IV of FIGURE 3;

2

Figure 5:
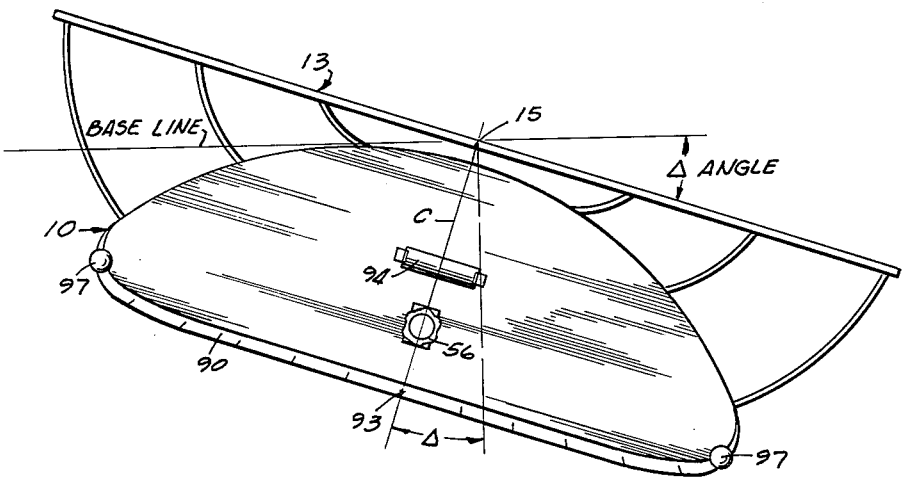
Figure 6:
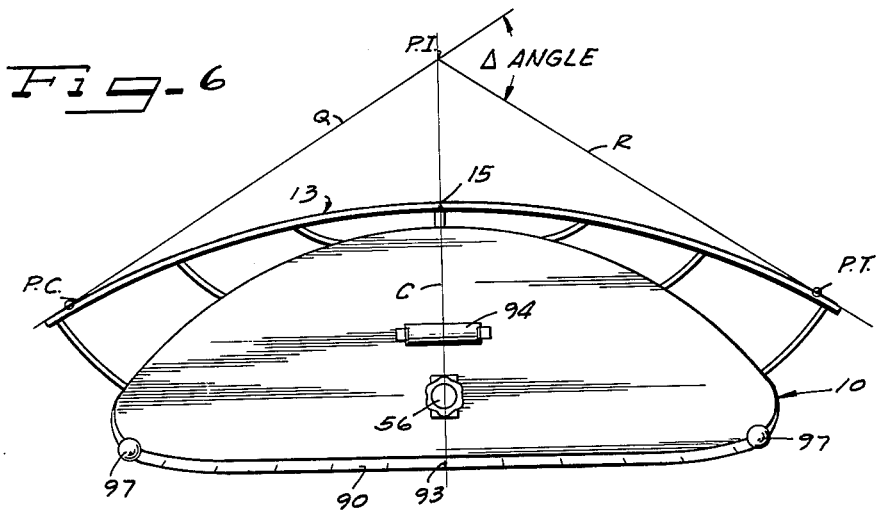

FIGURE 5 is a diagrammatic view illustrating a use of the drafting instrument for laying off angles; and FIGURE 6 is a diagrammatic view showing the use of a drafting instrument constructed in accordance with the principles of the present invention in laying out a curve projection.

In the embodiment of the invention illustrated in the drawings, I have shown in FIGURE 1 a drafting instrument 10 constructed in accordance with the principles of the present invention and including a flat base 11 having a forward or advance curved edge 12 struck from an arc, the center of which is on the extended transverse center of the base. I have also shown a flexible rule or scale 13 spaced in advance of the curved front edge 12 of the base 11, and having an indicia arrow or other marker 15 at the transverse center thereof and intersected by a transverse center line C of the base 11. A support bracket 16 extends from the advance face of the base 11 and is centered with the transverse center line of said base and is suitably secured thereto as by machine screws 17, 17 accessible through drilled holes 18, 18 in a guide plate 19, spaced above said base and extending parallel thereto. The bracket 16 is recessed within a central recessed portion 20 of the flexible rule 13 and is fixedly secured thereto, to support said rule with the bottom of the rule flush with the top surface of a drafting table and the like, as by a screw 21, as will hereinafter more clearly appear as this specification proceeds.

The flexible rule or scale 13 may be made from a flexible metal or a plastic material, a suitable material being a plastic material known to the trade as tenite, Butyrate 2394H–40153, although it need not necessarily be made from such a material. The flexible rule 13 has an inclined advance face 23 inclined outwardly with respect to the top surface thereof and terminating into a lower vertical face 24, forming a curved or straight edge, for a pencil and the like. The inclined face 23 has graduations 25 thereon which may designate inches and tenths of inches to enable the length of curve drawn to readily be measured.

The edge of the flexible rule 13, facing the curvate advance edge 12 of the base 11, has a plurality of equally spaced slots 26 opening therefrom to increase the flexibility of the rule. A wire 27 intersects the slots 26 and extends for the length of the rule and beyond opposite ends thereof. Connectors 29, 29 are suitably mounted on opposite ends of said wire. The wire 27 extends through the flat bracket 16 and is engaged by the screw 21, to retain the rule in position on said bracket. The rule also has a series of relatively wide notches 30 therein opening toward the curvate advance face 12 and receiving connectors 31, 31 and 32, 32 extending outwardly of actuator bars 33, 33 and 35, 35. The actuator bars are shown as being of an arcuate form in plan and guided for movement in arcuate paths along the base 11 in the space between the top surface of said base and the undersurface of the guide plate 19, as will hereinafter be more clearly described as this specification proceeds.

The connectors 29, 29 have reduced flattened end portions 36, 36 extending in slots (not shown) formed in the outer ends of outer actuator bars 39, 39 like the actuator bars 33 and 35 and guided for movement along the base 11 in space between the top surface of said base and the undersurface of the guide plate 19. Pivot screws 40, 40 pivotally connect the outer ends of the actuator bars 39, 39 with the connectors 29, 29.

The guide plate 19 is shown in FIGURES 1 and 2 as having three arcuate guide slots 41, 42 and 43 formed therein on each side of the transverse center line C of said guide plate. The guide slots 41, 42 and 43 conform generally to the forms of the actuator bars 33, 35 and 39 and form guides for said actuator bars guiding said bars to travel in predetermined arcuate paths to flex the flexible rule 13 to uniformly conform to a plurality of arcs. As shown in FIGURE 2, the guide slots 41, 41 are formed on arcs struck from centers A disposed equal distances from opposite sides of the transverse center line C of the base 11. The guide slots 42 are formed on arcs struck from centers E spaced outwardly of the centers A, equal distances from said centers. The arcuate guide slots 43 are formed on radii struck from centers F spaced outwardly of the centers F and spaced equal distances from opposite sides of the center line C. The three guide slots 41, 42 and 43 on opposite sides of the center line C thus form guides for the actuator bars 33, 35 and 39 guiding said actuator bars to move in predetermined arcuate paths the arcs of which are so located as to uniformly flex the rule 13 to conform to wide variety of uniform curves, the arcs of which are struck from centers intersecting the extended transverse center line C.

The actuator bars 33, 33 have spaced pins 45, 45 extending upwardly therefrom through the guide slots 41, for guiding said actuator bars for movement along the slots 41, 41. In a like manner the actuator bars 35, 35 have spaced pins 46, 46 extending upwardly therefrom through the slots 42, 42 and guiding said actuator bars for arcuate movement along said slots. The actuator bars 39, 39 also have spaced pins 47, 47 extending upwardly therefrom through the slots 43, 43 and guiding the actuator bars 39, 39 for movement in fixed arcuate paths along said slots.

The means for simultaneously moving the actuator bars 33, 35 and 39 on each side of the transverse center line C of the base 11, comprise an operating lever 48 pivotally mounted on each side of the center line C of the plate 11 on a pivot pin 49 disposed adjacent the advance face 12 of the base 11. Each operating lever 48 has three drive slots 50, 51 and 52 therein associated with the respective actuator bars 33, 35 and 39 for extensibly and retractibly moving said bars with respect to the advance curved face 12 of the base 11, upon pivotal movement of said operating levers. The slot 50 is shown as extending along the operating lever 48 and as being engaged by a drive pin 53 projecting upwardly of the actuator bar 33. The slot 51 is shown as extending at an acute angle with respect to the slot 50 and as being slidably engaged by a guide pin 46 for extensibly and retractibly moving the actuator bar 35 upon pivotal movement of the lever arm 48. The slot 52 is shown as being disposed at an acute angle with respect to the slot 51 and as being slidably engaged by a headed drive pin 55 extending upwardly of the actuator bar 39 through said slot. The slots 50, 51 and 52 are so inclined with respect to the respective guide slots 41, 42 and 43 as to drive the actuator bars 33, 35 and 39 along said slots in arcuate paths conforming to the forms of said guide slots, with no binding.

The operating levers 48, 48 are moved about the axes of the pivot pins 49, 49 by turning movement of a knob 56, the center of which intersects the center line C of the base 11. The knob 56 is mounted on the upper end of a shaft 60 and is journalled in a housing 61 for a pair of spaced racks 63, 63 slidably guided in said housing for extensible and retractible movement with respect to opposite ends thereof. The racks 63, 63 are meshed with a pinion 65 on the shaft 60. A set screw 66 is provided to secure the knob 56 to the upper end of the shaft 60. Each rack 63 has a right angled connector 67 on the free end thereof having an end of a link 69 pivotally connected thereto as by a pivot screw 70. The link 69 is shown as being adjustable along its length and has one portion 71 having a slot 72 extending therealong and another portion 73 shown as being disposed beneath the portion 72. Screws 75 extend through the slot 72, and are threaded in the portion 73, to accommodate the length of the link 69 to be adjusted in the conventional manner. A pivot screw 76 extends through a right angled connector end 77 of the link portion 73 of the link 69 and is threaded in the operating lever 48. Turning of the knob will thus effect movement of the racks 63, 63 in opposite directions and in turn pivot the operating levers 48, 48 toward or from each other, to extensibly and retractibly move the actuator bars 33, 33, 35, 35 and 39, 39 along the respective guide slots 41, 41, 42, 42 and 43, 43. A lock rod 80 is shown as being threaded in the rear face of the guide block 61 to engage a rack 63 (FIGURE 4) and retain the two racks from movement and thereby lock the flexible rule in a selected position of adjustment. The lock rod 80 has a right angled end portion 81 adapted to be grasped by the fingers to be turned one-half turn from a locking position to a release position.

Each actuator bar 39 has a threaded pin 83 extending upwardly therefrom intermediate the ends thereof and forming a mounting for a pointer 85. The pointer 85 on the actuator bar hown in FIGURES 1 and 2 as being a left-hand actuator bar cooperates with indicia on a degree scale, 86 mounted on the guide plate 19 and conforming to the arc of travel of the actuator bar 39. The scale 86 is spaced above the plate 19 by spacer collars 87 and is secured to said plate by nuts and bolts or screws 88, extending upwardly through said spacer collars.

The pointer 85 on the actuator bar 19 shown in FIGURES 1 and 2 as being a right-hand actuator bar cooperates with indicia on a scale 89, indicating the degree of curvature of the curve when in its various operative positions. The degree scale 89 is mounted on the plate 19 in vertically spaced relation with respect thereto in the same manner the radius scale 86 is mounted on said plate.

A rear face 90 of the base plate 11 is shown as sloping toward the table on which the instrument is used and as being of a generally curved form, so formed with respect to the transverse center line C of the base 11 as to form a protractor to measure angles in a conventional manner. The rear face 90 has a scale 91 thereon divided to designate angles and to enable the flexible rule 13 to be used to lay off angles, as turned off on the protractor scale. The protractor scale may be graduated in degrees and the degrees may be graduated in 10 minutes, although they may be divided into any increments of minutes desired or required. A back indicia arrow 93 on the center line C designates one protractor zero. The protractor can be read from either end toward the center of the instrument.

A handle 94 is spaced above the guide plate 19 and is secured thereto in spaced relation with respect to said guide plate by parallel spaced legs 95, 95, secured to opposite ends of said handle and having right angled feet 96, 96, screwed or otherwise secured to the guide plate 19.

Finger grips 97, 97 are also provided at opposite ends of the rear face of the base plate 11, to enable the ready turning of the instrument by the hand when on a drafting board, to position the flexible rule 13 in the proper position to serve as a templet, to draw a predetermined curve or straight line.

Referring now to FIGURE 5, showing the use of the drafting instrument for laying off angles, the indicia arrow 15 may be positioned at the intersection of a line perpendicular to a base line. The protractor scale 91 may then be moved about the point of intersection of the perpendicular line to the base line, until the required angle is indicated at the intersection of the perpendicular line to the protractor scale. The angle of the flexible rule with respect to the base line in the rectilinear position of the rule, will then be the same as the angle turned off on the protractor. The protractor scale may be turned either to the left or the right from the base line and angles may be turned from a base line extended beyond the point of intersection of the perpendicular line to the base line after a 45° angle is reached with the result that a total angle of 135° can be turned. Right angles may also be turned in a like manner from the base line back of the point of intersection of the perpendicular line to the base line.

In FIGURE 6 of the drawings the drafting instrument is shown in use for laying out a curve for a highway. In this figure, the tangent line Q is known as is the point of intersection of the tangent line Q to the front tangent line R. This point is commonly termed the P.I. point. The front indicia 15 is placed on the P.I. point. With the rule 13 straight the tangent distance on the tangent line is scaled off to establish the P.C. point, or point of curvature of the curve. A short line perpendicular to the tangent line is then drawn. The delta angle may then be turned off. The front tangent or tangent line R may then be drawn at the required delta angle with respect to the tangent line Q. The P.T. point, or point of tangency of the curve may then be scaled off on the tangent line R.

The rule 13 may then be set to the required degree of curvature and placed to extend along the P.C. point and the P.T. point. The desired curve may then be scribed in. In a similar manner, the instrument may be used to scribe in reverse curves and curves of various lengths and curvatures.

It may be seen from the foregoing that the instrument of the present invention may be used to scribe in various curves and straight lines in the design of highways and the like, that the instument is simple to operate and enables the degree of curvature, the radius of curvature and the length of the curve between any two tangent points to be visually indicated and determined at a glance.

It may further be seen that the instrument has various uses and is in the form of a universal instrument taking the place of a T square and the various railroad curves heretofore used in the design of highways and is so arranged as to enable straight lines and curves of various degrees of curvature to be readily scribed and to determine the various angles of the tangent lines of the highway curves with respect to each other.

While I have herein shown and described one form in which the invention may be embodied, it may be readily understood that various modifications and variations in the invention may be attained without departing from the spirit and scope of the novel concepts thereof.

I claim as my invention:

1. In a drafting instrument,
   a housing having an advance edge,
   a flexible rule spaced from said advance edge and having an indexing point intermediate the ends thereof,
   a fixed supporting connection between said housing and said rule in alignment with said indexing point and supporting said rule to flex about said fixed connection,
   and means flexing said rule equal amounts on each side of said indexing point to conform to uniform arcs in each position of flexure thereof comprising,
      at least two actuator bars guided for movement in arcuate paths,
      means pivotally connecting the ends of said actuator bars with opposite ends of said flexible rule,
      arcuate guides in said housing on opposite sides of the transverse center thereof and struck about axes offset from the transverse center of said housing and converging toward the transverse center of said housing,
      means guiding said actuator bars in said guides to move in arcuate paths,
      an individual actuator lever for each bar,
      said actuator levers being pivotally mounted on said housing on opposite sides of the transverse center thereof for movement about vertical axes disposed adjacent the advance edge of said housing,
      slidable operative connections between said actuator levers and said actuator bars,
      and manually operable means moving said actuator levers equal amounts in opposite directions to operate said actuator bars to flex said rule to conform to an exact radius of curvature for each position of flexure thereof.

2. In a drafting instrument,
   a housing having advance edge,
   a flexible rule spaced from said advance edge and having an indexing point intermediate the ends thereof,
   a fixed supporting connection between said housing and said rule in alignment with said indexing point and supporting said rule to flex about said fixed connection,
   and means flexing said rule equal amounts on each side of said indexing point to conform to uniform arcs in each position of flexure of said rule comprising,
      a plurality of actuator bars pivotally connected with said rule at points spaced along said rule on opposite sides of the indexing point thereof,
      arcuate guides for said actuator bars formed about radii struck from opposite sides of the transverse center of said housing and of increasing radius from the advance edge portion of said housing to the rear edge portion thereof,
      means guiding said actuator bars for movement along said guides in arcuate paths conforming to the arcs of said guides,
      operating levers for said bars pivotally mounted on said housing adjacent the advance edge portion thereof and on opposite sides of the transverse center of said housing,
      slidable guiding connections between said operating levers and said bars,
      and manually operable links moving said operating levers equal amounts in opposite directions to flex said rule to conform to exact radii of curvature, to form continuous arcs struck from a common center in each position of flexure thereof.

3. A drafting instrument in accordance with claim 2, wherein the actuator bars are of arcuate forms and conform to said curved guides,
   and wherein the actuator bars connected to the ends of said flexible rule have pointers thereon cooperating with indicia on said housing indicating the radius and degree of curvature of said scale.

4. A drafting instrument in accordance with claim 2, wherein the means for pivotally moving said operating levers includes links pivotally connected with said levers intermediate the ends thereof,
   a knob,
   and operative connections from said knob to said links for moving said links and operating levers in opposite directions upon turning movement of said knob in a single direction.

5. A drafting instrument in accordance with claim 4, wherein the operative connection from said knob to said links includes
   a pinion rotatably moved by said knob,
   racks meshing with said pinion and rectilinearly movable in opposite directions upon turning movement of said knob,
   and pivotal connections between said racks and links.

6. A drafting instrument particularly adapted for laying out roads comprising
   a flat base having an advance edge portion,
   a guide plate spaced above said base and generally conforming to the form of said base,
   a flexible rule having an indexing point intermediate the ends thereof,
   means supporting said rule on said base with the indexing point thereof intersecting the transverse center of said base,
   and means flexing said rule from a rectilinear position to a plurality of uniformly curved positions comprising
   at least two actuator arms pivotally connected to the ends of said flexible rule and slidably guided in the space between said base and said guide plate,
   arcuate guides in said guide plate formed from radii struck from opposite sides of the transverse center of said base,
   means guiding said actuator bars in said arcuate guides,
   means for extensibly and retractibly moving said actuator bars with respect to said base along said arcuate guides comprising
      lever arms pivotally connected to said base on opposite sides of the transverse center thereof and having slidable connection with said actuator bars,
      a knob,
      and means operated by turning movement of said knob for moving said lever arms and actuator bars equal amounts in opposite directions.

7. A drafting instrument in accordance with claim 6, wherein the actuator bars are of an arcuate form and generally conform to the forms of said arcuate guides, and
wherein said actuator bars each have a pointer thereon cooperating with indicia on said guide plate, one indicating the degree of curvature and the other indicating the arc of curvature of said flexible rule.

8. A drafting instrument in accordance with claim 7, wherein the operative connection from the knob to said lever arms comprises
   links pivotally connected to said lever arms intermediate the ends thereof,
   a pinion rotatably moved by said knob and racks meshing with said pinion and guided for rectilinear movement along said base and pivotally connected with said links and moved by said pinion equal amounts in opposite directions.

9. A drafting instrument particularly adapted for laying out roads comprising
   a flat base having an advance curved edge and a transverse axis intersecting the center of said curved edge,
   a flexible rule spaced in advance of said curved edge and having an indexing point intermediate the ends thereof,
   a fixed supporting connection between said base and said rule positioning said indexing point to intersect the transverse axis of said base,
   a guide plate spaced above said base and generally conforming to the form of said base,
   means flexing said rule about said indexing point to move from a straight line contour and define a plurality of uniform arcs from said straight line contour to said advance curved edge, comprising
      a plurality of actuator bars guided between said base and guide plate and having pivotal connection with said flexible rule at spaced points, equally spaced from opposite sides of said indexing point,
      arcuate guides for said actuator bars struck from arcs, the axes of which are spaced to opposite sides of the transverse center of said base,
      means guiding said bars in said guides and guiding the ends thereof to move in circumferential paths,
      operating means for said actuator bars including
         two levers pivotally mounted on said guide plate equal distances from the transverse center thereof and on opposite sides thereof and disposed adjacent said advance curved edge,
         slidable operative connections between said operating levers and said actuator bars,
         an individual link pivotally connected to each operating lever, intermediate the ends thereof,
         a knob,
         and operative connections between said knob and said links for moving said links and operating levers in opposite directions upon turning movement of said knob in one direction.

10. A drafting instrument in accordance with claim 9, wherein the actuator bars positioned in the rearwardmost positions with respect to said advance edge of said base are pivotally connected to the ends of said flexible rule and have pointers thereon,
wherein a degree scale is associated with one pointer, and wherein a radius scale is associated with the other pointer to enable the degree of curvature and radius of curvature of said flexible rule to be determined at a glance.

11. A drafting instrument in accordance with claim 10, wherein the connection between said knob and links for pivotally moving said operating levers includes
   a pinion rotatably moved by said knob,
   and racks slidably guided on said guide plate and meshing with said pinion on opposite sides thereof, and having pivotal connection with said links, for moving said links and operating levers equal amounts in opposite directions, upon turning movement of said knob in one direction.

12. A drafting instrument particularly adapted for laying out roads, comprising
   a flat base having a transverse axis and an advance curved edge, the arc of which is struck from an axis intersecting the extended transverse center line of said base,
   a guide plate spaced above said base and generally conforming to the form of said base,
   a flexible rule disposed in advance of said curved edge and having an indexing point intermediate the ends thereof, intersecting the extended transverse axis of said base,
   a fixed supporting connection between said base and said rule in alignment with said indexing point, and supporting said rule to flex thereabout from a rectilinear contour to a contour generally parallel to the advance edge of said base,
   means flexing said rule equal amounts on each side of said indexing point to comprise to a plurality of axes struck from axes intersecting the extended transverse center of said base comprising,
      a plurality of actuator bars of an arcuate form in plan and guided between said base and said guide plate and spaced along said base from the advance to the rear end portion thereof,
      the rearwardmost actuator bars having pivotal connection with opposite ends of said flexible rule and the intermediate actuator bars having pivotal connection with said flexible rule intermediate the ends thereof,
      arcuate guides in said guide plate coincident with said actuator bars,
      means on said bars slidably engaging said guides and guiding said bars to move along said guides with the ends of said bars movable in arcuate paths forming outward continuation of said guides,
      two oppositely movable operating levers,
      each being pivotally mounted on said guide plate equal distances from the transverse axis of said base,
      pin and slot connections between said operating levers and said actuator bars,
      a manually operable knob,
      and drive connections from said knob to said operating levers for moving said levers equal distances in opposite directions upon turning movement of said knob in one direction.

13. A drafting instrument in accordance with claim 12,
wherein pointers are mounted on the actuator bars
pivotally connected with the ends of said flexible
rule, one pointer having cooperation with a degree
scale and the other pointer having cooperation with
the radius scale,
whereby said pointers may indicate the degree and radius of curvature of said flexible rule at a glance.

14. A drafting instrument in accordance with claim 13,
wherein the operative connection from the knob to the operating levers includes
   a pinion rotatably moved by said knob upon turning movement thereof,
   racks guided for movement along said guide plate in rectilinear paths on opposite sides of said pinion,
   and links connected between the ends of said racks and connected with said levers intermediate the ends thereof, to effect movement of said levers equal amounts in opposite direction,
and wherein locking means are provided for said racks and pinions.

15. A drafting instrument comprising, in combination,
a flat base having a transverse axis and an advance edge extending in opposite directions from said transverse axis,
a guide plate spaced above said base and with said base forming a main housing,
   flexible rule supported intermediate its ends on said base in advance of an advance face of said base, and coincident with the transverse axis of said base,
a plurality of actuator bars guided between said base and guide plate for extensible and retractible movement with respect to the advance edge of said base, about axes the radii of which are struck from points spaced from opposite sides of the transverse axis of said base,
means pivotally connecting the free ends of said actuator bars with said flexible rule at spaced points therealong,
a pair of lever arms pivotally mounted on said guide plate for movement about axes spaced equal distances to opposite sides of said transverse axes,
slidable operating connections between said operating levers and said actuating bars,
and linkage connections connected with said operating levers intermediate the ends thereof, for simultaneously moving said operating levers and said actuator bars on each side of said transverse axis equal amounts in opposite directions, to uniformly vary the form of said flexible rule from a straight line condition to a plurality of arcuate conditions.

16. A drafting instrument in accordance with claim 15,
wherein the operating linkage connection comprise links pivotally connected to said operating levers intermediate the ends thereof,
oppositely movable racks pivotally connected to said links,
a single pinion meshing with said racks,
and a knob turning said pinion to move said racks and operating levers equal distances in opposite directions.

17. A drafting instrument in accordance with claim 16,
wherein each rearwardmost actuator bar has a pointer thereon
and in which individual scales have indicia thereon cooperating with said pointers to indicate the degree of curvature of said flexible rule and the radius of curvature of the curve defined by said flexible rule.

18. A drafting instrument in accordance with claim 15,
wherein the flexible rule is made from a plastic material and has a front face having scale thereon and has a back face having a plurality of parallel slots opening thereinto,
wherein a wire extends along said rule and intersects said slots, and forms a means for supporting said rule in advance of said base, and forms a connecting means for said actuator bars to said rule.

References Cited by the Examiner
UNITED STATES PATENTS

| | | | |
|---|---|---|---|
| 924,734 | 6/1909 | Clark | 33—177 |
| 1,086,440 | 2/1914 | Classon | 33—177 |
| 1,169,245 | 1/1916 | Finch | 33—177 |
| 1,743,704 | 1/1930 | Boux | 33—177 X |
| 2,232,369 | 2/1941 | Coffman et al. | 33—177 |
| 2,491,330 | 12/1949 | Petre | 33—177 |

ISAAC LISANN, *Primary Examiner.*